(12) United States Patent
Du et al.

(10) Patent No.: US 12,493,270 B2
(45) Date of Patent: Dec. 9, 2025

(54) ELECTRONIC APPARATUS AND CONTROL METHOD THEREOF

(71) Applicant: VIVO MOBILE COMMUNICATION CO., LTD., Guangdong (CN)

(72) Inventors: Xianhe Du, Dongguan (CN); Qiong Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 367 days.

(21) Appl. No.: 18/224,671

(22) Filed: Jul. 21, 2023

(65) Prior Publication Data

US 2023/0367273 A1    Nov. 16, 2023

Related U.S. Application Data

(63) Continuation of application No. PCT/CN2022/072225, filed on Jan. 17, 2022.

(30) Foreign Application Priority Data

Jan. 22, 2021    (CN) .......................... 202110091185.1

(51) Int. Cl.
*G05B 15/02*    (2006.01)
*G06F 9/451*    (2018.01)
(Continued)

(52) U.S. Cl.
CPC .......... *G05B 15/02* (2013.01); *H04M 1/0214* (2013.01); *H04M 1/0268* (2013.01); *G06F 1/1626* (2013.01); *G06F 9/451* (2018.02)

(58) Field of Classification Search
None
See application file for complete search history.

(56) References Cited

U.S. PATENT DOCUMENTS

| 8,963,857 B2 * | 2/2015 | Kim ...................... G06F 1/1652 |
| | | 345/173 |
| 10,168,737 B2 * | 1/2019 | Kemppinen .......... G06F 1/1626 |
| | (Continued) | |

FOREIGN PATENT DOCUMENTS

| CN | 106504645 A | * | 3/2017 | ............... G09G 3/20 |
| CN | 106997288 A | | 8/2017 | |
| | (Continued) | | | |

OTHER PUBLICATIONS

International Search Report and Written Opinion of the International Searching Authority regarding International Patent Application No. PCT/CN2022/072225, dated Apr. 13, 2022. Translation provided by Bohui Intellectual Property.

(Continued)

*Primary Examiner* — Mohammad Ali
*Assistant Examiner* — Kelvin Booker
(74) *Attorney, Agent, or Firm* — Harness, Dickey & Pierce, P.L.C.

(57) ABSTRACT

An electronic device includes a housing, a display screen and a deformation driving component. The second region of the display screen is connected to the first region of the display screen which is a first plane region. The deformation driving component is connected to an inner side of the second region, and deforms to drive the second region to switch between a flattened state and a bent state. The electronic device further includes a support mechanism which includes a flat plate support body and a motion driving component; in a case that the flat plate support body is in the support state, the flat plate support body is supported on an inner side of the deformation driving component; and in a case that the flat plate support body is in the avoidance state, the flat plate support body avoids the second region that is in the bent state.

16 Claims, 4 Drawing Sheets

(51) Int. Cl.
  *H04M 1/02* (2006.01)
  *G06F 1/16* (2006.01)

(56) References Cited

U.S. PATENT DOCUMENTS

| | | | | |
|---|---|---|---|---|
| 10,423,249 | B2* | 9/2019 | Xu | G06F 3/041 |
| 10,747,268 | B2* | 8/2020 | Kemppinen | H04M 1/0266 |
| 2015/0169002 | A1* | 6/2015 | Kemppinen | G06F 1/1633 |
| | | | | 361/679.55 |
| 2018/0374411 | A1 | 12/2018 | Yang et al. | |
| 2019/0086958 | A1* | 3/2019 | Kemppinen | G06F 1/1633 |
| 2020/0043385 | A1* | 2/2020 | Li | G09F 9/37 |
| 2020/0379507 | A1 | 12/2020 | Jan et al. | |
| 2020/0401189 | A1* | 12/2020 | Zheng | H04M 1/0264 |
| 2021/0089086 | A1* | 3/2021 | Zhong | G06F 1/1652 |
| 2022/0253106 | A1 | 8/2022 | Du et al. | |
| 2022/0261041 | A1 | 8/2022 | Du et al. | |
| 2022/0261043 | A1 | 8/2022 | Du et al. | |

FOREIGN PATENT DOCUMENTS

| | | | | |
|---|---|---|---|---|
| CN | 107680489 A | * | 2/2018 | G09F 9/301 |
| CN | 108319338 A | | 7/2018 | |
| CN | 207603695 U | * | 7/2018 | G09G 3/20 |
| CN | 109040359 A | * | 12/2018 | H04M 1/0268 |
| CN | 208401905 U | * | 1/2019 | H04M 10/0268 |
| CN | 110445913 A | * | 11/2019 | H04M 1/0268 |
| CN | 110515494 A | * | 11/2019 | G06F 3/0416 |
| CN | 110687967 A | * | 1/2020 | G06F 1/1652 |
| CN | 110879671 A | * | 3/2020 | H04M 1/0268 |
| CN | 110928364 A | * | 3/2020 | H04M 1/0266 |
| CN | 110928365 A | * | 3/2020 | G09F 9/301 |
| CN | 210168069 U | * | 3/2020 | G09F 9/301 |
| CN | 111669455 A | * | 9/2020 | G06F 1/1686 |
| CN | 112764863 A | | 5/2021 | |
| KR | 1020150081228 A | | 7/2015 | |

OTHER PUBLICATIONS

First Office Action regarding Chinese Patent Application No. 202110091185.1, dated Oct. 26, 2022. Translation provided by Bohui Intellectual Property.

First Office Action for Korean Patent Application No. 10-2023-7028289 dated Dec. 19, 2024. Translation provided by Bohui Intellectual Property.

* cited by examiner

ELECTRONIC APPARATUS AND CONTROL METHOD THEREOF

CROSS-REFERENCE TO RELATED APPLICATIONS

This application is a Bypass Continuation Application of PCT/CN2022/072225 filed on Jan. 17, 2022, which claims priority to Chinese Patent Application No. 202110091185.1 filed on Jan. 22, 2021, which are incorporated herein by reference in their entirety.

TECHNICAL FIELD

This application relates to the field of communication devices, in particular to an electronic device and a control method thereof.

BACKGROUND

With the development and maturity of the technology, the configuration of electronic devices has become increasingly high, and the aesthetic appreciation of users for electronic devices has also been further improved. The design of display screens of electronic devices is also following the needs of people with an increasing preference for the design of curved screens. This design has a huge visual impact and can bring different visual experience to users.

In current electronic devices, the design of curved screens can indeed bring different visual experience to users, but excessively curved glass has a certain impact on the screen content. Moreover, the design of curved screens may also cause the problems of accidental touch and edge reflection, which may lead to negative experience for users.

SUMMARY

According to the first aspect, this application discloses an electronic device, including a housing, a display screen and a deformation driving component, where the display screen is disposed on the housing; the display screen includes a first region and a second region; the first region is a first plane region, the second region is connected to the first region, and the second region is located at an edge of the display screen; the deformation driving component is connected to an inner side of the second region, and the deformation driving component deforms to drive the second region to switch between a flattened state and a bent state; in a case that the second region is in the flattened state, the second region is a second plane region, and the second plane region and the first plane region are located in a same plane; in a case that the second region is in the bent state, the second region bends relative to the first region; the electronic device further includes a support mechanism, and the support mechanism includes a flat plate support body and a motion driving component; the flat plate support body is movable relative to the second region; the motion driving component is connected to the flat plate support body; the motion driving component is disposed in the housing; the motion driving component drives the flat plate support body to switch between a support state and an avoidance state; in a case that the flat plate support body is in the support state, the flat plate support body is supported on an inner side of the deformation driving component; and in a case that the flat plate support body is in the avoidance state, the flat plate support body avoids the second region that is in the bent state.

According to the second aspect, this application discloses a control method of an electronic device. The control method includes:
receiving an input; controlling the deformation driving component to drive the second region to be in the flattened state in a case that the input is a first input; and controlling the deformation driving component to drive the second region to be in the bent state in a case that the input is a second input.

According to the third aspect, this application discloses a control apparatus of an electronic device. The control apparatus includes: a receiving module, configured to receive an input; a first control module, configured to control the deformation driving component to drive the second region to be in the flattened state in a case that the input is a first input; and a second control module, configured to control the deformation driving component to drive the second region to be in the bent state in a case that the input is a second input.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

LIST OF REFERENCE NUMERALS

Figure 1:
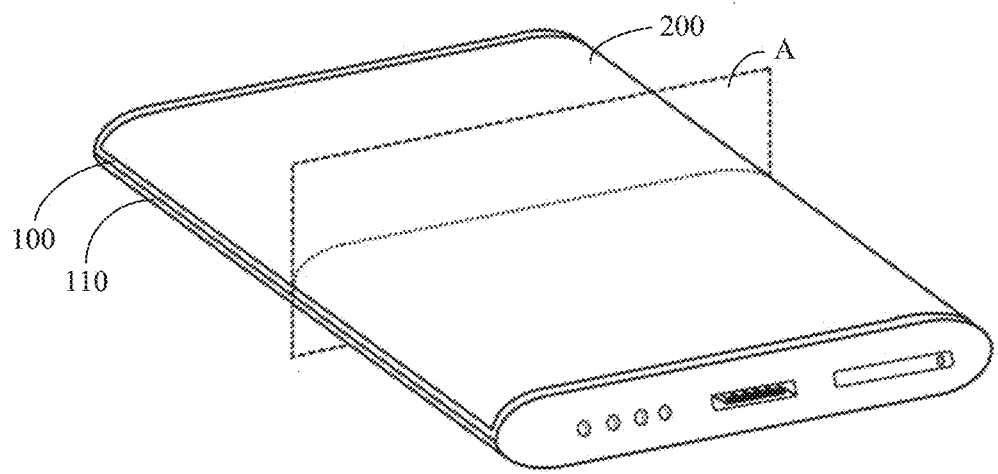
FIG. 1 is a schematic structural view of an electronic device disclosed in an embodiment of this application.
Figure 2:
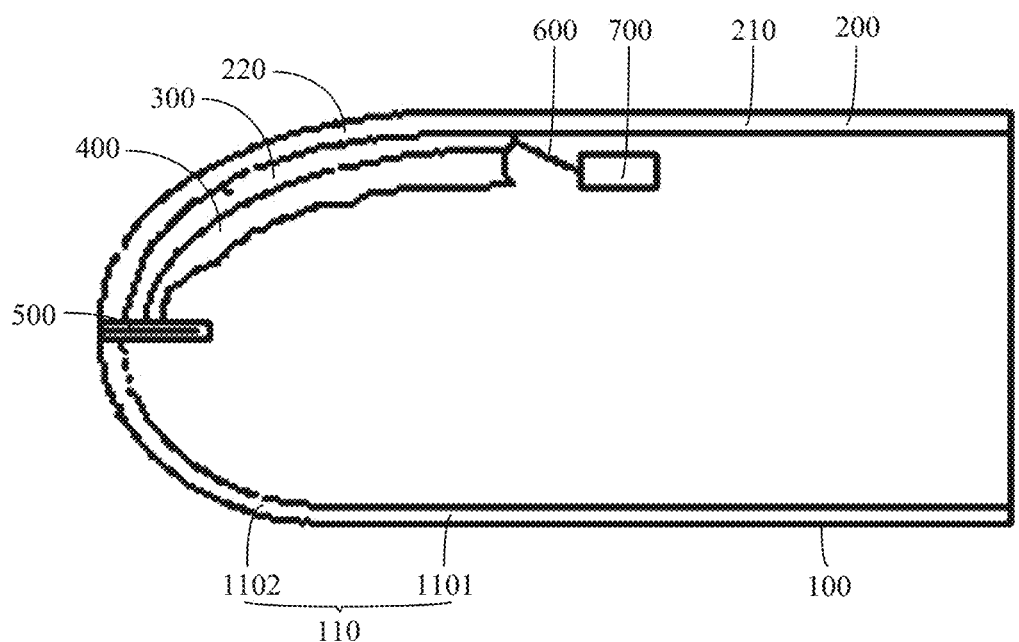
FIG. 2 is a cross-sectional view of a portion of the structure taken from a cross section A in FIG. 1.
Figure 3:
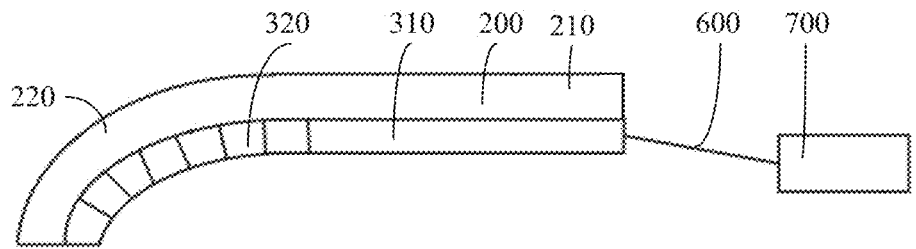
FIG. 3 is a schematic structural view of a support structure and a power source of an electronic device disclosed in an embodiment of this application.
Figure 4:
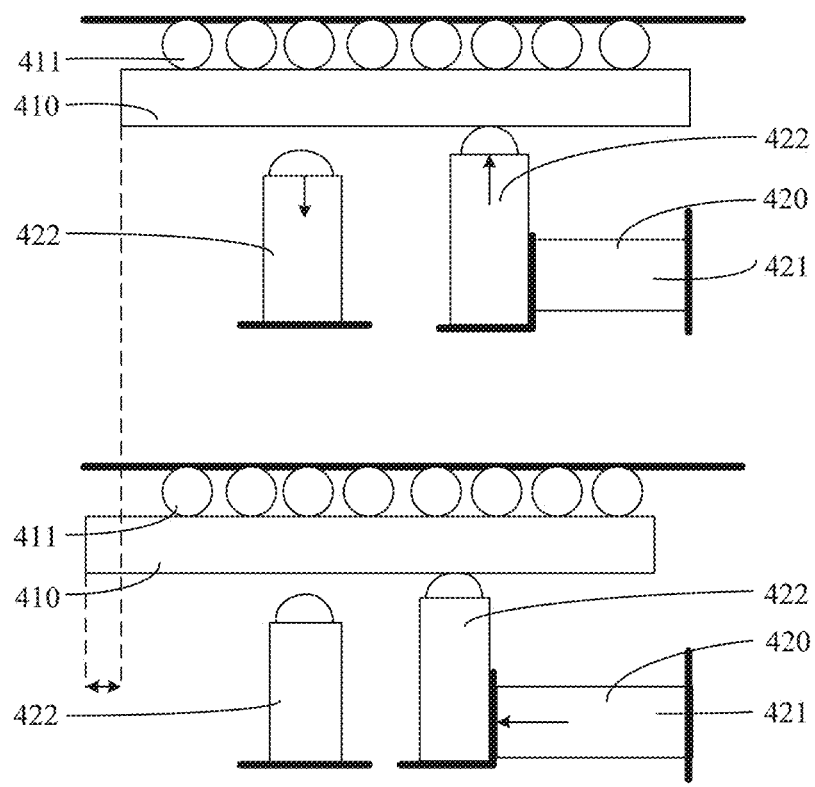
FIG. 4 is a schematic view of motion of a support structure of an electronic device disclosed in an embodiment of this application.
Figure 5:
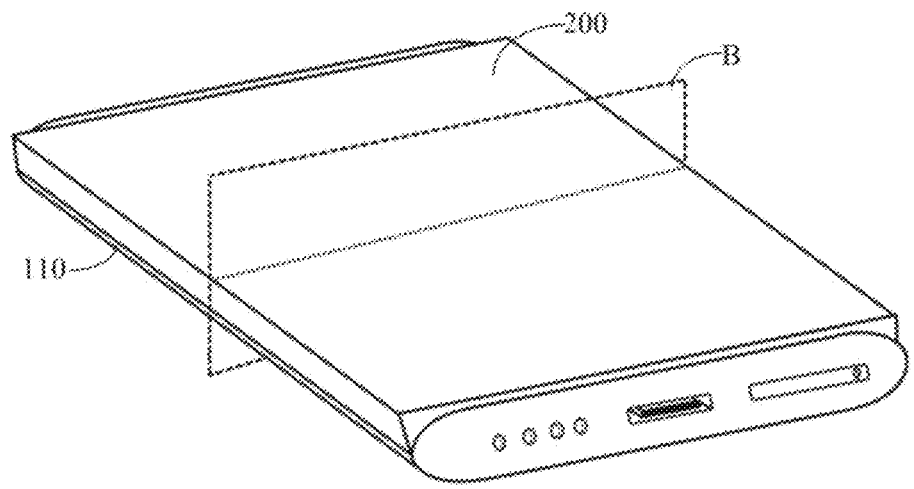
FIG. 5 is a schematic structural view of a second region in a flattened state of an electronic device disclosed in an embodiment of this application.
Figure 6:
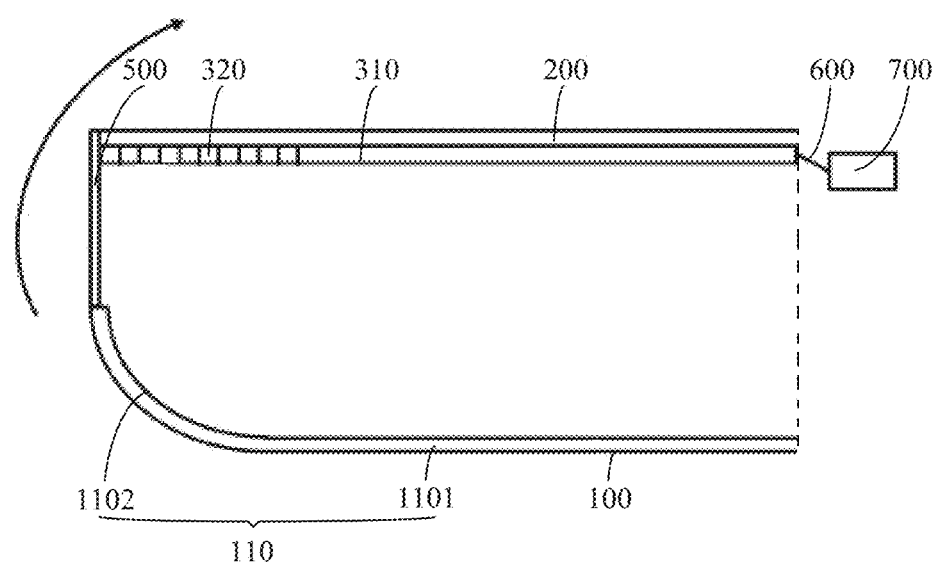
FIG. 6 is a cross-sectional view of a portion of the structure taken from a cross section B in FIG. 5.

100—housing, 110—rear cover, 1101—plane component, 1102—bent component;
200—display screen, 210—first region, 220—second region;
300—deformation driving component, 310—base component, 320—deformation body component;
400—support mechanism, 410—flat plate support body, 411—rotating shaft, 420—motion driving component, 421—first deformation structural component, 422—second deformation structural component; and
500—folding mechanism, 600—flexible electrical connector, 700—power source.

DETAILED DESCRIPTION

To more clearly states the objectives, technical solutions, and advantages of this application, the technical solutions of this application will be clearly described below with reference to specific embodiments of this application and the accompanying drawings. Apparently, the described embodiments are merely a part rather than all of the embodiments of this application. All other embodiments obtained by a person of ordinary skill in the art based on the embodiments of this application shall fall within the protection scope of this application.

The technical solution disclosed in each embodiment of this application is described in detail below through specific embodiments with reference to the accompanying drawings.

As shown in FIG. 1 to FIG. 6, an embodiment of this application discloses an electronic device. The disclosed electronic device includes a housing 100, a display screen 200 and a deformation driving component 300. The housing 100 is configured to provide a layer of protection for other components in the electronic device to avoid collision damage of these components.

The display screen 200 is disposed on the housing 100, the display screen 200 includes a first region 210 and a second region 220, the first region 210 is a first plane region, the second region 220 is connected to the first region 210, and the second region 220 is located at an edge of the display screen 200.

The deformation driving component 300 is connected to an inner side of the second region 220, and the deformation driving component 300 deforms to drive the second region 220 to switch between a flattened state and a bent state. There are multiple types of deformation driving component 300, such as an electricity-induced deformation driving component, a field-induced deformation driving component, and a driving motor, which is not specifically limited in this embodiment of this application. The second region 220 can be switched between the flattened state and the bent state through the deformation driving component 300, the states of the second region 220 are different, and the display scopes of the display screen 200 are different. In a case that the second region 220 is in the flattened state, the second region 220 is a second plane region, the second plane region and the first plane region are located in a same plane, and at this time, the first region 210 and the second region 220 are located in the same plane to form the display screen 200 with a larger display scope, which facilitates some games that require screen operations, thereby providing a better visual effect for users, and enhancing game experience and visual experience of users. In a case that the second region 220 is in the bent state, the second region 220 bends relative to the first region 210, and at this time, the second region 220 that is in the bent state is connected to the first plane region to form a shape of a waterfall screen in appearance, thereby providing a visual impact of a borderless display screen for users, and bringing a good grip feeling.

In addition, the electronic device further includes a support mechanism 400, and the support mechanism 400 is configured to support the deformation driving component 300, so that the structure of the display screen 200 is relatively stable in a case that the deformation driving component 300 deforms to drive the second region 220 to switch between the flattened state and the bent state. The support mechanism 400 includes a flat plate support body 410 and a motion driving component 420, and the flat plate support body 410 is movable relative to the second region 220. With the switching of the second region 220 between the flattened state and the bent state, the state of the flat plate support body 410 is also changed. The motion driving component 420 is connected to the flat plate support body 410, the motion driving component 420 is disposed in the housing 100, and the motion driving component 420 drives the flat plate support body 410 to switch between a support state and an avoidance state. In a case that the flat plate support body 410 is in the support state, the flat plate support body 410 is supported on an inner side of the deformation driving component 300. At this time, the flat plate support body 410 supports the deformation driving component 300, the second region 220 is in the flattened state, and the flat plate support body 410 can play a support role, so that the second region is in a better flattened state. In a case that the flat plate support body 410 is in the avoidance state, under the action of the motion driving component 420, the flat plate support body 410 avoids the second region 220 that is in the bent state.

According to the electronic device disclosed in this embodiment of this application, by improving the structure of the electronic device in the background art, the support mechanism 400 supports the deformation driving component 300. According to different user requirements, the deformation driving component 300 deforms to cause the second region 220 to switch between the flattened state and the bent state. In a case that users need better visual experience and game experience, the second region 220 is in the flattened state under the action of the deformation driving component 300, and the flat plate support body 410 in the support mechanism 400 is supported on the inner side of the deformation driving component 3M) under the action of the motion driving component 420 and is in the support state. At this time, the first plane region and the second region 220 are located in the same plane, which can meet the requirements of users for game experience, holographic viewing, and other scenes. In a case that users need the electronic device to be in a routine mode, the second region 220 is in the bent state, and the flat plate support body 410 in the support mechanism 400 avoids the second region 220 that is in the bent state under the action of the motion driving component 420 to form a waterfall-shaped display screen 200, thereby bringing a good grip feeling to users. It can be seen that in the electronic device disclosed in this embodiment of this application, the display screen 200 can be switched between two different screen display modes, thereby solving the problem of poor user experience caused by the design of curved screens of current electronic devices.

In a feasible mode, the electronic device may further include a folding mechanism 500, and the folding mechanism 500 is connected to the second region 220 and the housing 100 in a sealed mode. In a case that the second region 220 is in the flattened state, with the movement of the second region 220, the folding mechanism 500 is in an unfolded state, thereby further stabilizing the structure of the display screen 200, avoiding the situation of insufficient screen rigidity of the display screen 200, and also better sealing the gap formed between the second region 220 and the housing 100 due to flattening. In a case that the second region 220 is in the bent state, the folding mechanism 500 is in a folded state, and the folding mechanism 500 can be folded inside the electronic device to achieve storage.

In another feasible mode, the electronic device may further include an elastic connection mechanism, and there are multiple types of elastic connection mechanism, such as a spring and a leaf spring, which is not specifically limited in this embodiment of this application. The elastic connection mechanism is connected to the second region 220 and the housing 100 in a sealed mode. In a case that the second region 220 is in the flattened state, the elastic connection mechanism is in an extended state, and the elastic connection mechanism that is in the extended state can form a larger coverage area, thereby sealing the gap formed between the second region 220 and the housing 100 due to flattening to avoid the exposure of the internal structure of the electronic device and also play a better role in dust and water prevention. In a case that the second region 220 is in the bent state, the elastic connection mechanism is in a shortened state, thereby better adapting to the change in distance between the second region 220 and the housing 100.

In a technical solution, the deformation driving component 300 may include a base component 310 and a deformation body component 320, and the deformation body component 320 is connected to the base component 310. The base component 310 is fixed on the inner surface of the first plane region, thereby avoiding deformation. The deformation body component 320 is attached to the inner surface of the second region 220. The design of attaching to the inner surface of the display screen 200 can achieve a hidden design effect, thereby increasing the space utilization of the electronic device. The deformation body component 320 deforms to drive the second region 220 to switch between the flattened state and the bent state, so that the display screen 200 of the electronic device can achieve different screen display modes to enrich the use choices of users.

In addition, there are multiple types of deformation driving component 300. In a feasible mode, the deformation driving component 300 may be a field-induced deformation structural component. Under the action of an electric field, the deformation driving component 300 deforms to drive the second region 220 to switch between the flattened state and the bent state, so that the display screen 200 of the electronic device can be switched between two different modes to meet different user requirements.

Of course, the deformation driving component 300 may be an electricity-induced deformation structural component. The electronic device further includes a flexible electrical connector 600. A first end of the flexible electrical connector 600 is electrically connected to the electricity-induced deformation structural component, and a second end of the flexible electrical connector 600 is electrically connected to a power source 700 in the electronic device. Through the flexible electrical connector 600, the power source 700 may supply electrical energy to the electricity-induced deformation structural component, so that the electricity-induced deformation structural component may deform after being energized. There are multiple types of flexible electrical connector 600, which may be a flexible cable or a flexible circuit board. In a case that the flexible electrical connector 600 is the flexible circuit board, the power source 700 may be integrated on the flexible circuit board, and the flexible circuit board may supply electrical power to the electricity-induced deformation structural component and control the working conditions of the electricity-induced deformation structural component.

In another feasible mode, the deformation driving component 300 may be the electricity-induced deformation structural component. In the process that the deformation driving component 300 deforms to drive the second region 220 to switch from the bent state to the flattened state, a first voltage and a second voltage are sequentially inputted into the electricity-induced deformation structural component, and the second voltage is greater than the first voltage. In a case that the first voltage is inputted into the electricity-induced deformation structural component, the electricity-induced deformation structural component drives the second region 220 to be in the bent state. In a case that the second voltage that is greater than the first voltage is inputted into the electricity-induced deformation structural component, the electricity-induced deformation structural component deforms to drive the second region 220 to be in the flattened state. This mode avoids the use of a driving motor of a mechanical structure for deformation, thereby saving the internal space of the electronic device and increasing the space utilization of the electronic device.

In this embodiment of this application, the housing 100 may include a rear cover 110, the rear cover 110 includes a plane component 1101 and a bent component 1102, and the bent component 1102 is connected to the plane component 1101. In a case that the second region 220 is in the bent state, the bent component 1102 is connected to the second region 220, thereby improving the integrity of the appearance of the electronic device. In a technical solution, a tangent line of the bent component 1102 at a joint of the second region 220 and the bent component 1102 and a tangent line of the second region 220 at the joint are collinear, thereby improving the gripping performance of the electronic device.

In the electronic device disclosed in this embodiment of this application, the flat plate support body 410 may be in rolling contact with the inner surface of the display screen 200 through at least two rotating shafts 411, thereby reducing the friction generated by the relative movement between the flat plate support body 410 and the display screen 200.

The motion driving component 420 includes a first deformation structural component 421 and a second deformation structural component 422. A first end of the first deformation structural component 421 is connected to the housing 100, and a second end of the first deformation structural component 421 is connected to the second deformation structural component 422. The first deformation structural component 421 drives the second deformation structural component 422 to move close to or away from the edge of the display screen 200, thereby achieving support close to the edge of the display screen 200 or achieving avoidance away from the edge of the display screen 200. The second deformation structural component 422 is movably disposed in the housing 100, and the second deformation structural component 422 is supported on the inner side of the deformation driving component 300. The second deformation structural component 422 can move close to or away from the deformation driving component 300 to support or avoid the second region 220 through the deformation driving component 300, thereby achieving adaptive support for the deformation of the second region 220.

There are a plurality of second deformation structural components 422, and the plurality of second deformation structural components 422 can form a whole driven by the first deformation structural component 421, so that the plurality of second deformation structural components 422 can move close to or away from the deformation driving component 300.

There are multiple types of first deformation structural component 421 and second deformation structural component 422, which may be electricity-induced deformation structural components or field-induced deformation structural components, which are not specifically limited in this embodiment of this application. In a case that both the first deformation structural component 421 and the second deformation structural component 422 are electricity-induced deformation structural components, a constant voltage is inputted into the first deformation structural component 421 and the second deformation structural component 422 to achieve the expansion and contraction changes of the first deformation structural component 421 and the second deformation structural component 422. In a working process, in a case that the constant voltage is inputted into the second deformation structural component 422, the second deformation structural component 422 is in contact with the flat plate support body 410, and then, the constant voltage is inputted into the first deformation structural component 421, thereby pushing the second deformation structural component 422 to move close to the edge of the display screen 200. At this time, the second deformation structural component 422 is close to the deformation driving component 300, so that the flat plate support body 410 is in the support state, and the second region 220 is in the flattened state under the action of the deformation driving component 300. In the process of avoidance, the first deformation structural component 421 and the second deformation structural component 422 can move in opposite directions by adjusting the direction of the voltage.

Based on the electronic device described above, this application discloses a control method of the electronic device. The disclosed control method includes:

an input is received,
where according to different input states of the electronic device, the working states of the deformation driving component 300 are controlled to be different, so that the second region 220 is switched between the flattened state and the bent state;
in a case that the input is a first input, the deformation driving component 300 is controlled to drive the second region 220 to be in the flattened state; and
in a case that the input is a second input, the deformation driving component 300 is controlled to drive the second region 220 to be in the bent state.

By controlling the deformation of the deformation driving component 300 to drive the second region 220 to switch between the flattened state and the bent state, users can select different screen display modes, thereby solving the problems of the visual angle of curved screens, the need for edge screen operations in games, and the accidental touch. Moreover, the second region 20 can be flattened to achieve better display, so that it is possible to avoid the problem of screen edge reflection caused by bending, which affects the display; and the advantages of visual impact and better grip feeling of curved screens are retained, so that users have better use experience.

Based on the electronic device and the control method of the electronic device described above, this application discloses a control apparatus of the electronic device. The disclosed control apparatus includes:

a receiving module, configured to receive an input,
where the receiving module is configured to receive the input, in a case that different inputs are received, the inputs are sent to different control modules, and the control modules control the deformation driving component 300 to perform different works;
a first control module, configured to control the deformation driving component 300 to drive the second region 220 to be in the flattened state in a case that the input is a first input; and
a second control module, configured to control the deformation driving component 300 to drive the second region 220 to be in the bent state in a case that the input is a second input.

This mode can achieve the switching of the second region 220 between the flattened state and the bent state to achieve different screen display effects.

There are multiple electronic devices disclosed in this embodiment of this application, such as a mobile phone, a tablet computer and a reader, which is not specifically limited in this embodiment of this application.

Figure 7:
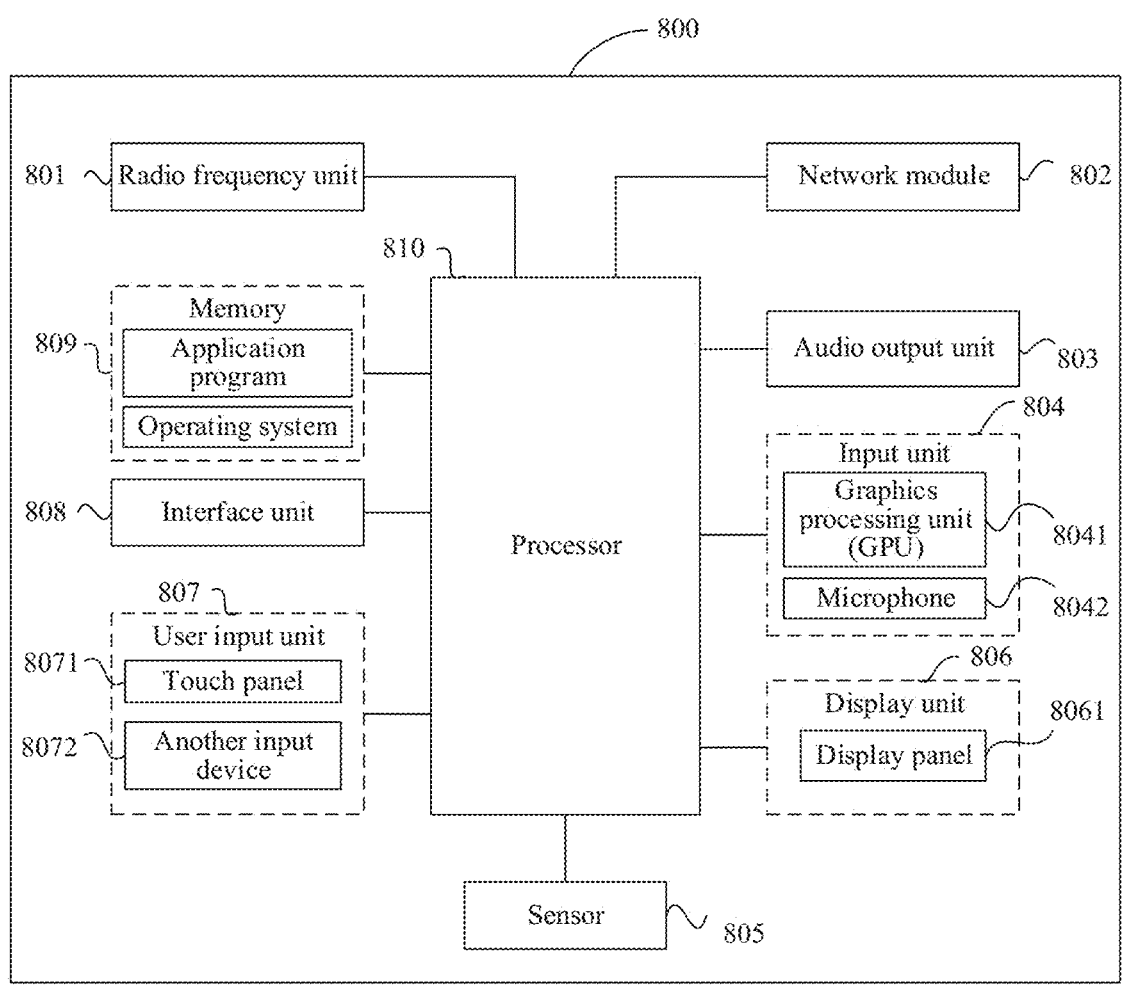
FIG. 7 is a schematic view of hardware structures of an electronic device in an embodiment of this application.

FIG. 7 is a schematic view of hardware structures of an electronic device in an embodiment of this application.

The electronic device 800 includes, but is not limited to, components such as a radio frequency unit 801, a network module 802, an audio output unit 803, an input unit 804, a sensor 805, a display unit 806, a user input unit 807, an interface unit 808, a memory 809, and a processor 810.

A person skilled in the art may understand that the electronic device 800 may further include a power source (such as a battery) for supplying power to each component. The power source may be logically connected to the processor 810 through a power management system, thereby implementing functions, such as charging, discharging, and power consumption management, through the power management system. The structure of the electronic device shown in FIG. 7 constitutes no limitation on the electronic device, and the electronic device may include more or fewer components than those shown in the figure, or combinations of some components, or a different component deployment, which are not described in detail herein again.

It is to be understood that in this embodiment of this application, the input unit 804 may include a graphics processing unit (GPU) 8041 and a microphone 8042. The GPU 8041 processes image data of a static picture or a video that is obtained by an image acquisition apparatus (for example, a camera) in a video acquisition mode or an image acquisition mode. The display unit 806 may include a display panel 8061, and the display panel 8061 may be configured in the form of a liquid crystal display (LCD), an organic light-emitting diode (OLED), and the like. The user input unit 807 includes a touch panel 8071 and another input device 8072. The touch panel 8071 is also referred to as a touch screen. The touch panel 8071 may include a touch detection apparatus and a touch controller. The another input device 8072 may include, but not limited to, a physical keyboard, a functional key (such as a volume control key and a switch key), a track ball, a mouse, and a joystick, which are not described in detail herein again.

In this embodiment of this application, after the radio frequency unit 801 receives downlink data from a network side device, the downlink data is sent to the processor 810 for processing. In addition, uplink data is sent to the network side device. Generally, the radio frequency unit 801 includes, but is not limited to, an antenna, at least one amplifier, a transceiver, a coupler, a low noise amplifier, a duplexer, and the like.

The memory 809 may be configured to store software programs or instructions and various data. The memory 809 may mainly include a storage program or an instruction area and a data storage area, where the storage program or the instruction area may store an operating system, an application program or instruction required by at least one function (such as a sound playback function, and an image playback function), and the like. In addition, the memory 809 may include a high-speed random access memory (RAM) and may further include a non-volatile memory, where the non-volatile memory may be a read-only memory (ROM), a programmable ROM (PROM), an erasable PROM (EPROM), an electrically EPROM (EEPROM), or a flash memory, such as at least one magnetic disk memory device, a flash memory device or other non-volatile solid-state memory devices.

The processor 810 may include one or more processing units. Optionally, the processor 810 may integrate an application processor and a modem processor, where the application processor mainly processes an operating system, a user interface, an application program or instruction, and the like, and the modem processor mainly processes wireless communication, such as a baseband processor. It can be understood that the foregoing modem processor may be not integrated into the processor 810.

An embodiment of this application further provides a chip, the chip includes a processor and a communication interface, and the communication interface is coupled with the processor. The processor is configured to run network side device programs or instructions to implement each process of the embodiment of the control method of the electronic device, and the same technical effects can be achieved, which will not be described in detail herein again to avoid repetition.

The key descriptions in the previous embodiments of this application are the differences between the embodiments. As long as different optimization features between the embodiments are not contradictory, the embodiments may be combined to form a preferable embodiment, which will not be described in detail herein again considering the concise writing.

The foregoing descriptions are merely embodiments of this application and are not intended to limit this application. For a person skilled in the art, various modifications and variations can be made to this application. Any modification, equivalent replacement, improvement and the like made within the spirit and principle of this application shall fall within the scope of the claims of this application.

What is claimed is:

1. An electronic device, comprising a housing, a display screen and a deformation driving component, wherein the display screen is disposed on the housing:
   the display screen comprises a first region and a second region;
   the first region is a first plane region, the second region is connected to the first region, and the second region is located at an edge of the display screen;
   the deformation driving component is connected to an inner side of the second region, and the deformation driving component deforms to drive the second region to switch between a flattened state and a bent state:
      in a case that the second region is in the flattened state, the second region is a second plane region, and the second plane region and the first plane region are located in a same plane; and
      in a case that the second region is in the bent state, the second region bends relative to the first region;
   the electronic device further comprises a support mechanism, and the support mechanism comprises a flat plate support body and a motion driving component;
   the flat plate support body is movable relative to the second region;
   the motion driving component is connected to the flat plate support body;
   the motion driving component is disposed in the housing;
   the motion driving component drives the flat plate support body to switch between a support state and an avoidance state:
      in a case that the flat plate support body is in the support state, the flat plate support body is supported on an inner side of the deformation driving component; and
      in a case that the flat plate support body is m the avoidance state, the flat plate support body avoids the second region that is in the bent state,
         wherein the flat plate support body is in rolling contact with an inner surface of the display screen through at least two rotating shafts; and
   the motion diving component comprises a first deformation structural component and a second deformation structural component:
      a first end of the first deformation structural component is connected to the housing, and a second end of the first deformation structural component is connected to the second deformation structural component;
      the first deformation structural component drives the second deformation structural component to move close to or away from the edge of the display screen;
      the second deformation structural component is movably disposed in the housing;
      the second deformation structural component is supported on the inner side of the deformation driving component; and
      the second deformation structural component can move close to or away from the deformation driving component.

2. The electronic device according to claim 1, wherein the electronic device further comprises a folding mechanism, and the folding mechanism is connected to the second region and the housing in a sealed mode; in a case that the second region is in the flattened state, the folding mechanism is in an unfolded state; and in a case that the second region is in the bent state, the folding mechanism is in a folded state.

3. The electronic device according to claim 1, wherein the electronic device further comprises an elastic connection mechanism, and the elastic connection mechanism is connected to the second region and the housing in a sealed mode; in a case that the second region is in the flattened state, the elastic connection mechanism is in a shortened state; and in a case that the second region is in the bent state, the elastic connection mechanism is in an extended state.

4. The electronic device according to claim 1, wherein the deformation driving component comprises a base component and a deformation body component; the base component is fixed on an inner surface of the first plane region; the deformation body component is attached to an inner surface of the second region; and the deformation body component deforms to drive the second region to switch between the flattened state and the bent state.

5. The electronic device according to claim 1, wherein the deformation driving component is a field-induced deformation structural component.

6. The electronic device according to claim 5, wherein the deformation driving component is an electricity-induced deformation structural component; the electronic device further comprises a flexible electrical connector; a first end of the flexible electrical connector is electrically connected to the electricity-induced deformation structural component; and a second end of the flexible electrical connector is electrically connected to a power source in the electronic device.

7. The electronic device according to claim 5, wherein the deformation driving component is an electricity-induced deformation structural component; in a process that the deformation driving component deforms to drive the second region to switch from the bent state to the flattened state, a first voltage and a second voltage are sequentially inputted into the electricity-induced deformation structural component; and the second voltage is greater than the first voltage.

8. The electronic device according to claim 1, wherein the housing comprises a rear cover; the rear cover comprises a plane component and a bent component; the bent component is connected to the plane component; and in a case that the second region is in the bent state, the bent component is connected to the second region, and a tangent line of the bent component at a joint of the second region and the bent component and a tangent line of the second region at the joint are collinear.

9. A control method of an electronic device, wherein the electronic device comprises a housing, a display screen and a deformation driving component, wherein the display screen is disposed on the housing:
the display screen comprises a first region and a second region;
the first region is a first plane region, the second region is connected to the first region, and the second region is located at an edge of the display screen;
the deformation driving component is connected to an inner side of the second region, and the deformation driving component deforms to drive the second region to switch between a flattened state and a bent state:
in a case that the second region is in the flattened state, the second region is a second plane region, and the second plane region and the first plane region are located in a same plane; and
in a case that the second region is in the bent state, the second region bends relative to the first region;
the electronic device further comprises a support mechanism, and the support mechanism comprises a flat plate support body and a motion driving component;
the flat plate support body is movable relative to the second region;
the motion driving component is connected to the flat plate support body;
the motion driving component is disposed m the housing;
the motion driving component drives the flat plate support body to switch between a support state and an avoidance state;
in a case that the flat plate support body is in the support state, the flat plate support body is supported on an inner side of the deformation driving component; and
in a case that the flat plate support body is in the avoidance state, the flat plate support body avoids the second region that is in the bent state:
and the control method comprises:
receiving an input;
controlling the deformation driving component to drive the second region to be in the flattened state in a case that the input is a first input; and
controlling the deformation driving component to drive the second region to be in the bent state in a case that the input is a second input,
wherein the flat plate support body is in rolling contact with an inner surface of the display screen through at least two rotating shafts; and
the motion driving component comprises a first deformation structural component and a second deformation structural component:
a first end of the first deformation structural component is connected to the housing, and a second end of the first deformation structural component is connected to the second deformation structural component;
the first deformation structural component drives the second deformation structural component to move close to or away from the edge of the display screen;

the second deformation structural component is movably disposed in the housing;
the second deformation structural component is supported on the inner side of the deformation driving component; and
the second deformation structural component can move close to or away from the deformation driving component.

10. The control method of the electronic device according to claim 9, wherein the housing comprises a rear cover; the rear cover comprises a plane component and a bent component; the bent component is connected to the plane component; and in a case that the second region is in the bent state, the bent component is connected to the second region, and a tangent line of the bent component at a joint of the second region and the bent component and a tangent line of the second region at the joint are collinear.

11. The control method of the electronic device according to claim 9, wherein the electronic device further comprises a folding mechanism, and the folding mechanism is connected to the second region and the housing in a sealed mode; in a case that the second region is in the flattened state, the folding mechanism is in an unfolded state; and in a case that the second region is in the bent state, the folding mechanism is in a folded state.

12. The control method of the electronic device according to claim 9, wherein the electronic device further comprises an elastic connection mechanism, and the elastic connection mechanism is connected to the second region and the housing in a sealed mode; in a case that the second region is in the flattened state, the elastic connection mechanism is in a shortened state; and in a case that the second region is in the bent state, the elastic connection mechanism is in an extended state.

13. The control method of the electronic device according to claim 9, wherein the deformation driving component comprises a base component and a deformation body component; the base component is fixed on an inner surface of the first plane region; the deformation body component is attached to an inner surface of the second region; and the deformation body component deforms to drive the second region to switch between the flattened state and the bent state.

14. The control method of the electronic device according to claim 9, wherein the deformation driving component is a field-induced deformation structural component.

15. The control method of the electronic device according to claim 14, wherein the deformation driving component is an electricity-induced deformation structural component; the electronic device further comprises a flexible electrical connector; a first end of the flexible electrical connector is electrically connected to the electricity-induced deformation structural component; and a second end of the flexible electrical connector is electrically connected to a power source in the electronic device.

16. The control method of the electronic device according to claim 14, wherein the deformation driving component is an electricity-induced deformation structural component; in a process that the deformation driving component deforms to drive the second region to switch from the bent state to the flattened state, a first voltage and a second voltage are sequentially inputted into the electricity-induced deformation structural component; and the second voltage is greater than the first voltage.

* * * * *